(12) United States Patent
Eguchi

(10) Patent No.: US 9,791,692 B2
(45) Date of Patent: Oct. 17, 2017

(54) ELECTROOPTICAL DEVICE, METHOD FOR MANUFACTURING ELECTROOPTICAL DEVICE, AND ELECTRONIC APPARATUS

(71) Applicant: Seiko Epson Corporation, Tokyo (JP)

(72) Inventor: Yoshikazu Eguchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/807,400

(22) Filed: Jul. 23, 2015

(65) Prior Publication Data

US 2016/0025965 A1   Jan. 28, 2016

(30) Foreign Application Priority Data

Jul. 25, 2014   (JP) ................................. 2014-151558

(51) Int. Cl.
| | | |
|---|---|---|
| *G02B 26/08* | (2006.01) | |
| *G02B 1/14* | (2015.01) | |
| *G02B 5/08* | (2006.01) | |

(52) U.S. Cl.
CPC ............ *G02B 26/0841* (2013.01); *G02B 1/14* (2015.01); *G02B 5/0833* (2013.01)

(58) Field of Classification Search
USPC ....... 359/290–292, 237, 242, 246, 247, 295, 359/298
See application file for complete search history.

(56) References Cited

U.S. PATENT DOCUMENTS

| | | |
|---|---|---|
| 5,490,009 A | 2/1996 | Venkateswar et al. |
| 5,629,794 A | 5/1997 | Magel et al. |
| 5,757,411 A | 5/1998 | Florence |
| 2003/0121794 A1 | 7/2003 | Horsthemke |
| 2005/0128564 A1 | 6/2005 | Pan |
| 2007/0053052 A1* | 3/2007 | Pan ...................... B81B 3/0005 359/291 |
| 2010/0053477 A1 | 3/2010 | Hui et al. |

FOREIGN PATENT DOCUMENTS

| | | | |
|---|---|---|---|
| JP | 08-234120 A | 9/1996 | |
| JP | 08-254661 A | 10/1996 | |
| JP | 08-265672 A | 10/1996 | |
| JP | 09-101467 A | 4/1997 | |
| JP | 2000-103651 | * 11/1998 | ............. C03C 27/06 |
| JP | 2003-021794 A | 1/2003 | |
| JP | 2007-304350 | * 5/2006 | ........... G02F 1/1333 |
| JP | 2007-510174 A | 4/2007 | |
| JP | 2010-217397 A | 9/2010 | |

* cited by examiner

*Primary Examiner* — Brandi Thomas
(74) *Attorney, Agent, or Firm* — ALG Intellectual Property, LLC

(57) ABSTRACT

An electrooptical device includes a substrate, a mirror that is made up of a plurality of films which are arranged so as to be separated from the substrate on one plane of the substrate, and a supporting portion that is arranged between the substrate and the mirror, and has a portion which is connected to a portion of the mirror so as to support the mirror, in which the mirror includes a third mirror film which is a reflective metal film that is arranged on a side of the mirror which is opposite to the substrate, a second mirror film which is a high melting point metal film that is arranged between the reflective metal film and the substrate, and a first mirror film which is an antioxidative film that is arranged between the high melting point metal film and the substrate.

9 Claims, 6 Drawing Sheets

ELECTROOPTICAL DEVICE, METHOD FOR MANUFACTURING ELECTROOPTICAL DEVICE, AND ELECTRONIC APPARATUS

BACKGROUND

1. Technical Field

The present invention relates to an electrooptical device, a method for manufacturing an electrooptical device, and an electronic apparatus.

2. Related Art

As an electronic apparatus described above, for example, a projector where light which is emitted from a light source, is concentrated with an optical deflection device which is referred to as a DMD (digital micro mirror device) as an electrooptical device, and is enlarged and projected by a projection optical system, and thereby, colors are displayed on a screen, is known.

The optical deflection device is a device where a plurality of micro mirrors are arrayed in a matrix shape. On a surface of the micro mirror, a metal film having reflectivity is arranged. Therefore, the light which is emitted from the light source, is reflected by the micro mirror, and thereby, an image is displayed. The optical deflection device sequentially modulates blue light, green light, and red light which are emitted from the light source.

However, the surface of the metal film (for example, aluminum) having the reflectivity, is made to be uneven, and thereby, the scattered light occurs, and there is a problem that luminance is lowered. For example, as described in JP-A-2003-21794, a technology of making a smooth reflective place in which a film thickness is made to be uniform by forming aluminum on a metal film (for example, titanium) where migration of the aluminum is suppressed, is disclosed.

However, the metal film such as titanium is oxidized by being exposed into the atmosphere. Hereby, an oxidation film is formed on the titanium, and a warpage occurs in the micro mirror, and a reflectance is lowered. As a result, there is the problem that the luminance is lowered.

SUMMARY

The invention can be realized in the following forms or application examples.

APPLICATION EXAMPLE 1

An electrooptical device according to this application example, includes a substrate, a mirror that is arranged so as to be separated from the substrate on one plane of the substrate, and a supporting portion that is arranged between the substrate and the mirror, and has a portion which is connected to a portion of the mirror so as to support the mirror, in which the mirror includes a reflective metal film that is arranged on a side of the mirror which is opposite to the substrate, a high melting point metal film that is arranged between the reflective metal film and the substrate, and an antioxidative film that is arranged between the high melting point metal film and the substrate.

According to this application example, since the reflective metal film is arranged on the high melting point metal film, for example, a space difference between spaces of a lattice plane of a portion where the two films overlap each other, can be small, and it is possible to flatten a surface of the reflective metal film which is the uppermost film. As a result, it is possible to enhance a reflectance, and it is possible to enhance luminance. Moreover, since the high melting point metal film is interposed between the reflective metal film and the antioxidative film, even when the mirror which is configured of the films, is exposed into the atmosphere, an oxidation film can be suppressed from being formed on the high melting point metal film. As a result, it is possible to suppress occurrence of a warpage in the mirror. As a result, it is possible to enhance the luminance.

APPLICATION EXAMPLE 2

In the electrooptical device according to the application example, it is preferable that the high melting point metal film is titanium, or a titanium nitride.

According to the application example, the high melting point metal film is the titanium, or the titanium nitride, and a plane orientation of a crystal becomes (002) without being affected on a base film, and the space difference of the lattice plane between the high melting point metal film and the reflective metal film which is arranged thereon, becomes small, and thus, it is possible to suppress the occurrence of unevenness on the surface of the reflective metal film.

APPLICATION EXAMPLE 3

In the electrooptical device according to the application example, it is preferable that the reflective metal film is aluminum.

According to the application example, since the reflective metal film is the aluminum, it is possible to efficiently reflect light which is concentrated with the mirror. Moreover, when the plane orientation of the crystal of the high melting point metal film is (002), since the space difference of the lattice plane is small, the plane orientation of the crystal of the aluminum which is arranged thereon, can be (111). Accordingly, the surface of the reflective metal film can be suppressed from being uneven.

APPLICATION EXAMPLE 4

In the electrooptical device according to the application example, it is preferable that the antioxidative film is aluminum, or an titanium nitride.

According to the application example, since the aluminum or the titanium nitride as an antioxidative film is arranged in the base of the high melting point metal film, it is possible to suppress the exposure of the titanium. Accordingly, it is possible to suppress the oxidation of materials configuring the mirror, particularly, the titanium, and it is possible to suppress the occurrence of the warpage in the mirror. Still more, by using the aluminum as an antioxidative film, since the antioxidative film is the same material as the reflective metal film, the well-balanced oxidation is performed above and below, and the warpage is unlikely to occur. On the other hand, by using the titanium nitride as an antioxidative film, since the titanium nitride is unlikely to be oxidized, a titanium nitride film can be thin, and it is possible to make an operation of the mirror easy.

APPLICATION EXAMPLE 5

A method for manufacturing an electrooptical device according to this application example, includes forming a sacrificial layer on one plane of a substrate, forming a contact hole in the sacrificial layer, forming an antioxidative film on a side of the sacrificial layer which is opposite to the substrate, and in an opening portion of the contact hole, forming a high melting point metal film on a side of the antioxidative film which is opposite to the substrate, forming a reflective metal film on a side of the high melting point metal film which is opposite to the substrate, forming a mirror by patterning the antioxidative film, the high melting point metal film, and the reflective metal film, and removing the sacrificial layer.

According to this application example, since the reflective metal film is formed on the high melting point metal film, for example, the space difference between the spaces of the lattice plane of the portion where the two films overlap each other, can be small, and it is possible to flatten the surface of the reflective metal film which is the uppermost film. As a result, it is possible to enhance the reflectance, and it is possible to enhance the luminance. Moreover, since the high melting point metal film is formed by being interposed between the reflective metal film and the antioxidative film, even when the mirror which is configured of the films, is exposed into the atmosphere (even when fluorine gas is used), the oxidation film can be suppressed from being formed on the high melting point metal film. As a result, it is possible to suppress the occurrence of a warpage in the mirror. As a result, it is possible to enhance the luminance.

APPLICATION EXAMPLE 6

In the method for manufacturing an electrooptical device according to the application example, it is preferable that using fluorine gas after the forming of the mirror, is further included.

According to the application example, even when the fluorine gas is used, since the high melting point metal film is stacked by being interposed between the reflective metal film and the antioxidative film, it is possible to suppress addition of damage to the high melting point metal film.

APPLICATION EXAMPLE 7

In the method for manufacturing an electrooptical device according to the application example, it is preferable that the high melting point metal film is titanium, or a titanium nitride.

According to the application example, the high melting point metal film is the titanium, or the titanium nitride, and the plane orientation of the crystal becomes (002) without being affected on the base film, and the space difference of the lattice plane between the high melting point metal film and the reflective metal film which is formed thereon, becomes small, and thus, it is possible to suppress the occurrence of the unevenness on the surface of the reflective metal film.

APPLICATION EXAMPLE 8

In the method for manufacturing an electrooptical device according to the application example, it is preferable that the reflective metal film is aluminum.

According to the application example, since the reflective metal film is the aluminum, it is possible to efficiently reflect the light which is concentrated with the mirror. Moreover, when the plane orientation of the crystal of the high melting point metal film is (002), since the space difference of the lattice plane is small, the plane orientation of the crystal of the aluminum which is formed thereon, can be (111). Accordingly, the surface of the reflective metal film can be suppressed from being uneven.

APPLICATION EXAMPLE 9

In the method for manufacturing an electrooptical device according to the application example, it is preferable that the antioxidative film is aluminum, or an titanium nitride.

According to the application example, since the aluminum or the titanium nitride as an antioxidative film is formed in the base of the high melting point metal film, it is possible to suppress the exposure of the titanium. Accordingly, it is possible to suppress the oxidation of the materials configuring the mirror, particularly, the titanium, and it is possible to suppress the occurrence of the warpage in the mirror. Still more, by using the aluminum as an antioxidative film, since the antioxidative film is the same material as the reflective metal film, the well-balanced oxidation is performed above and below, and the warpage is unlikely to occur. On the other hand, by using the titanium nitride as an antioxidative film, since the titanium nitride is unlikely to be oxidized, the titanium nitride film can be thin, and it is possible to make the operation of the mirror easy.

APPLICATION EXAMPLE 10

An electronic apparatus according to this application example, includes the electrooptical device described above.

According to this application example, it is possible to provide the electronic apparatus that is capable of enhancing display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments embodying the invention, will be described with reference to drawings. Furthermore, the used drawings are displayed by appropriately being enlarged or reduced, so as to make the described portion to be in an identifiable state.

In the following embodiments, for example, a case of being described as "on substrate", indicates the case of being arranged on a substrate so as to come into contact with the substrate, or the case of being arranged through other components on the substrate, or the case where a portion is arranged on the substrate so that the portion comes into contact with the substrate, or the case where a portion is arranged through other components on the substrate.

Configuration of Projector as Electronic Apparatus

Figure 1:
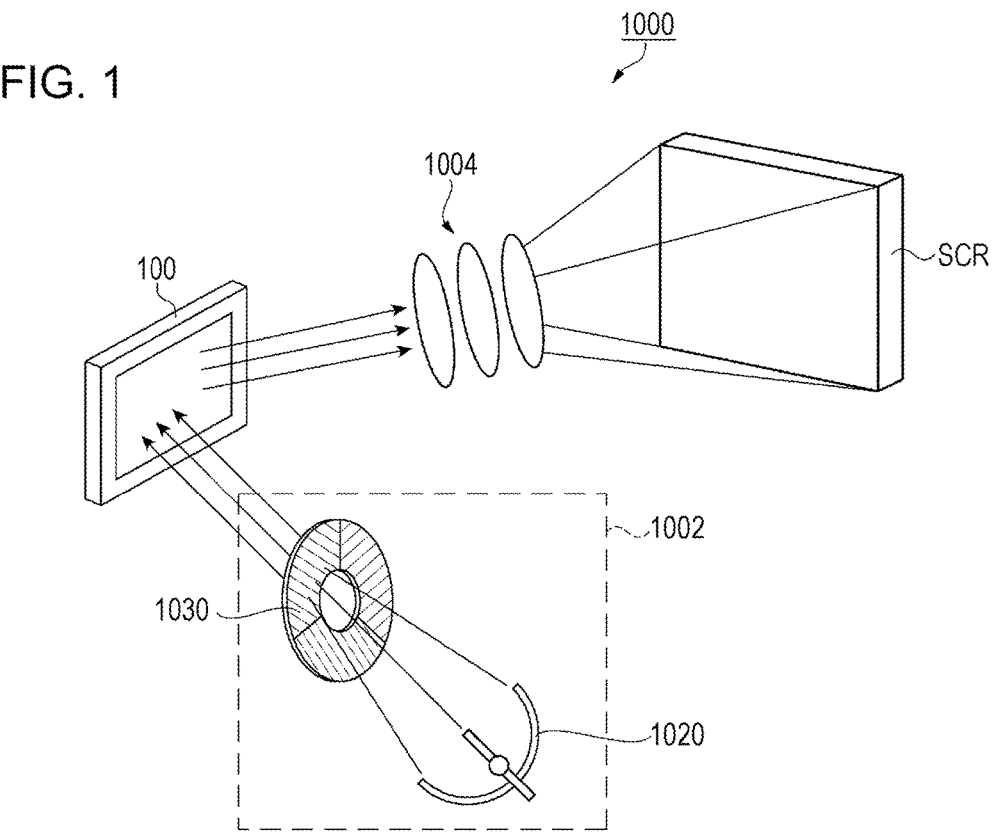
FIG. 1 is a schematic diagram illustrating an optical system of a projector as an electronic apparatus.

FIG. 1 is a schematic diagram illustrating an optical system of a projector as an electronic apparatus. Hereinafter, the optical system of the projector will be described with reference to FIG. 1.

As illustrated in FIG. 1, a projector 1000 is configured to include a light source device 1002, an optical deflection device 100 that modulates light which is emitted from the light source device 1002 depending on image information, and a projection optical system 1004 that projects the modulated light from the optical deflection device 100 as a projection image.

The light source device 1002 includes a light-emitting element 1020, and a fluorescent body substrate 1030. The light source device 1002 is a laser light source that emits blue laser light (peak of light-emitting intensity: for example, approximately 445 nm). On an optical path of the laser light which is emitted from the light-emitting element 1020, the fluorescent body substrate 1030 is arranged.

Moreover, if being the light having a wavelength which can excite a fluorescent material described later, the light-emitting element 1020 may be a excitation light source that emits the color light having a peak wavelength other than 445 nm. Still more, as a method for brightening the projection image, three optical deflection devices may be used.

Configuration of Optical Deflection Device as Electrooptical Device

Figure 2:
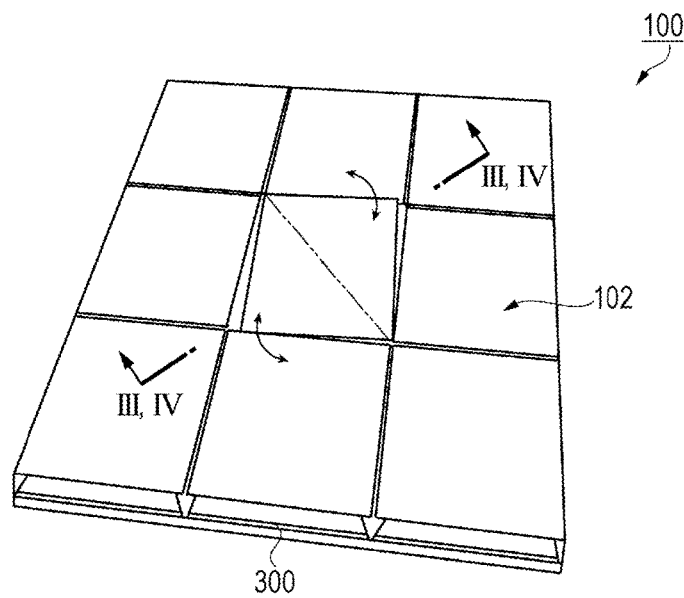
FIG. 2 is a schematic diagram illustrating a configuration of an optical deflection device as an electrooptical device.
Figure 3:
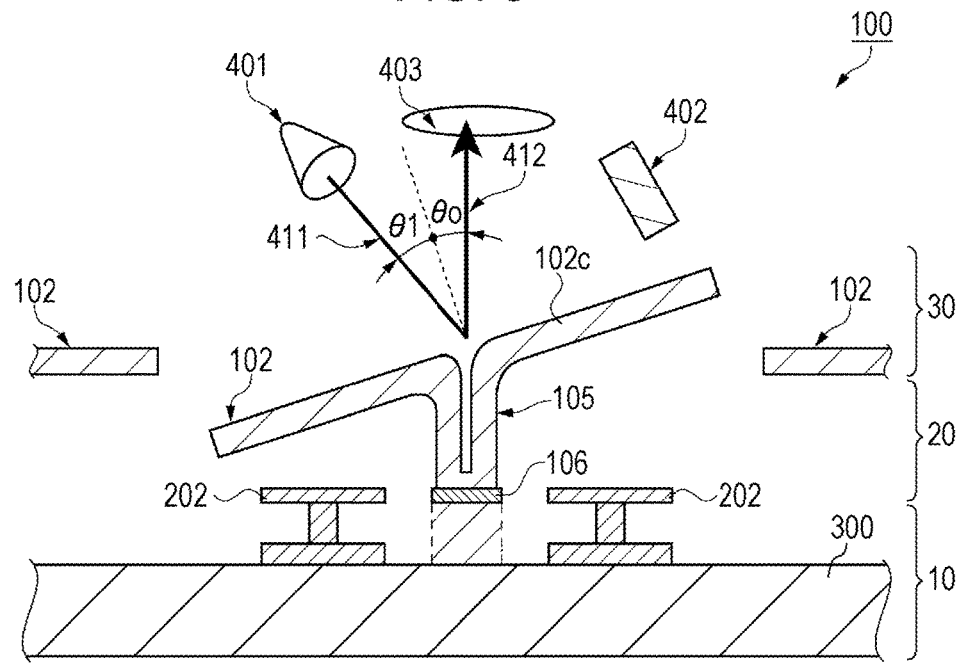
FIG. 3 is a schematic cross-sectional view which is taken along III-III line of the optical deflection device illustrated in FIG. 2, and is a schematic cross-sectional view illustrating an operation of a mirror of the optical deflection device.
Figure 4:
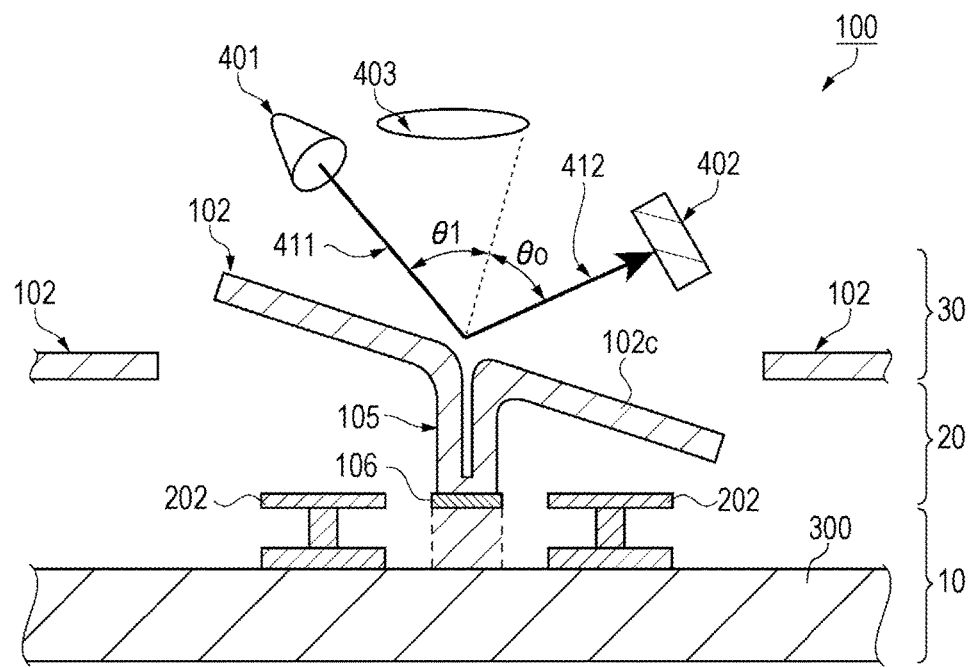
FIG. 4 is a schematic cross-sectional view which is taken along IV-IV line of the optical deflection device illustrated in FIG. 2, and is a schematic cross-sectional view illustrating the operation of the mirror of the optical deflection device.

FIG. 2 is a schematic diagram illustrating a configuration of an optical deflection device as an electrooptical device. FIG. 3 and FIG. 4 are schematic cross-sectional views which are taken along III-III and IV-IV lines of the optical deflection device illustrated in FIG. 2, and are schematic cross-sectional views illustrating an operation of a mirror of the optical deflection device. Hereinafter, the configuration and the operation of the optical deflection device, will be described with reference to FIG. 2 to FIG. 4.

As illustrated in FIG. 2, in an optical deflection device (DMD) 100, on an upper side of a wafer substrate 300 as a substrate, a mirror 102 is supported into a matrix shape through a hinge 106, and a support 105 (see FIG. 3, regarding the components). For example, the wafer substrate 300 is a silicon substrate. On a surface of the mirror 102, a reflective metal film for reflecting the light, is formed. As a reflective metal film, for example, aluminum is used.

As illustrated in FIG. 3, the optical deflection device 100 of the embodiment, includes three main portions of a bottom portion 10 including a control circuit, an intermediate portion 20 including an electrode 202 and the hinge 106, and an upper portion 30 that is covered by a mirror 102 including a embedded torsion hinge and a cavity.

Since the operation of each mirror 102 of the optical deflection device 100 is selectively controlled, the bottom portion 10 has the wafer substrate 300 including an address designation circuit. The address designation circuit includes a memory cell for a communication signal, and wiring of a word line or a bit line. The electrical address designation circuit on the wafer substrate 300, can be assembled by using a standard CMOS technology, and is similar to a static random access memory (SRAM).

The intermediate portion 20 is configured of the electrode 202, the hinge 106, and the support 105. The electrode 202 is designed so as to enhance capacitive coupling efficiency of an electrostatic torque during angle crossing transition. The mirror 102 is pulled toward one electrode 202, by electrostatic force of the electrode 202. Moreover, when the mirror 102 is pulled toward the electrode 202, the hinge 106 is twisted, and when a voltage is not applied to the electrode 202, the twist is made so as to return. Since electrostatic attraction is in inverse proportion to square between the mirror 102 and the electrode 202, an influence is clear when the mirror 102 is inclined at a landing position.

The upper portion 30 is covered by the mirror 102 that is configured of a stacked film which includes a third mirror film 102c as a flat reflective metal film on an upper plane. The hinge 106 of the mirror 102 is formed so as to be a portion of the mirror 102. Additionally, on a lower side of the mirror 102, a gap which only rotates a predetermined angle by retaining a minimum distance, is given.

When a directional light 411 from an illumination light source 401, forms an incident angle θ1, FIG. 3 illustrates a cross-sectional view of a portion of the optical deflection device 100 based on one embodiment of the invention. When the optical deflection device 100 is measured in a normal direction, a deflected light 412 has an angle θo. In a digital operation mode, the configuration is generally referred to as an "On" position.

During the operation in which the mirror 102 is rotated toward another electrode 202 below the side which is opposite to the hinge 106, FIG. 4 illustrates a cross-sectional view of the same portion of the optical deflection device 100. The directional light 411 and the deflected light 412 form more larger angles θ1 and θo. The deflected light 412 is emitted toward a light absorbing device 402.

Figure 5:
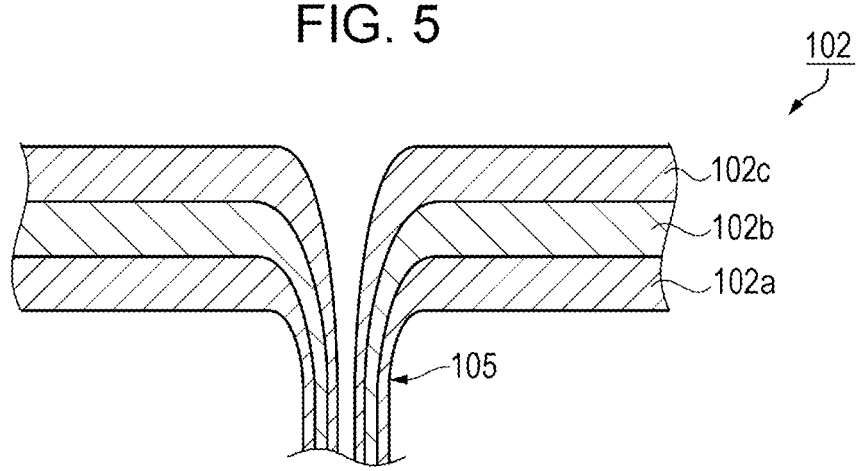
FIG. 5 is a schematic cross-sectional view illustrating the configuration of the mirror of the optical deflection device.

FIG. 5 is a schematic cross-sectional view illustrating the configuration of the mirror of the optical deflection device. Hereinafter, the configuration of the mirror will be described with reference to FIG. 5.

As illustrated in FIG. 5, the mirror 102 is configured by stacking three materials. In the mirror 102, a first mirror film 102a as an antioxidative film from a lower layer side, and next, a second mirror film 102b as a high melting point metal film, and the third mirror film 102c as a reflective metal film which is the uppermost layer, are stacked.

As a material of the first mirror film 102a, for example, aluminum (Al) may be used. As a material of the second mirror film 102b, for example, titanium (Ti), or a titanium nitride (TiN) may be used. As a material of the third mirror film 102c, for example, aluminum (Al) may be used. Furthermore, instead of the aluminum (Al), an aluminum alloy may be used.

A plane orientation of a crystal of the titanium is (002). A space of a lattice plane of the titanium is 2.342 A. The plane orientation of the crystal of the aluminum is (111). The space of the lattice plane of the aluminum is 2.338 A. Since a difference between both is 0.006 A, and is very small, it is possible to form the film of the aluminum on the titanium.

For example, a thickness of the first mirror film 102a is 1300 Å. For example, the thickness of the second mirror film 102b is 200 Å. For example, the thickness of the third mirror film 102c is 1000 Å.

In this manner, a film thickness of the aluminum is approximately 1000 Å to 1300 Å, and thereby, even when a surface of the aluminum is oxidized, the oxidation can be held on the surface, and the aluminum can be unlikely to be influenced by the oxidation.

According to the mirror 102 of such the configuration, since the third mirror film 102c as a reflective metal film, is formed on the second mirror film 102b as a high melting point metal film, a space difference between the high melting point metal film of a first lattice plane space and the reflective metal film of a second lattice plane space, can be small. As a result, it is possible to flatten the surface of the third mirror film 102c which is formed on the second mirror film 102b.

Method for Manufacturing Electrooptical Device

Figure 6:
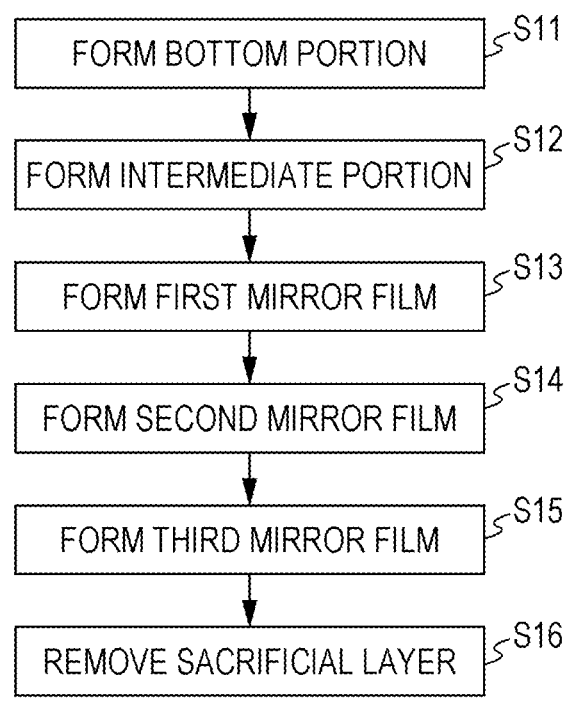
FIG. 6 is a flowchart illustrating a method for manufacturing an optical deflection device in procedure.

FIG. 6 is a flowchart illustrating a method for manufacturing an optical deflection device as an electroopcial device in procedure. FIGS. 7A to 8C are schematic cross-sectional views partially illustrating the method for manufacturing an optical deflection device in procedure. Hereinafter, the method for manufacturing an optical deflection device, will be described with reference to FIG. 6 to FIG. 8C.

Figure 7A:
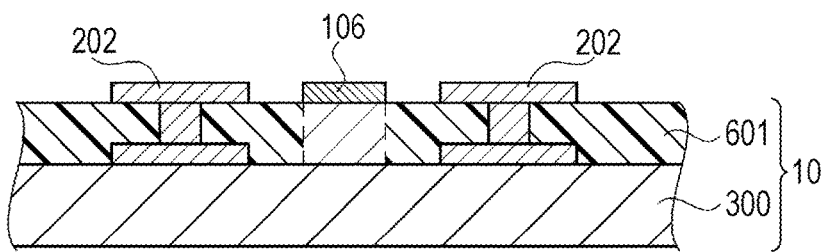
FIGS. 7A to 7D are schematic cross-sectional views partially illustrating the method for manufacturing an optical deflection device in procedure.

First, in a step S11, the bottom portion 10 is formed. Specifically, as illustrated in FIG. 7A, by using a known method, a control circuit (not illustrated) is formed in the wafer substrate 300. Thereafter, a first sacrificial layer 601 is accumulated on the surface of the wafer substrate 300. The first sacrificial layer 601 may be made by spin coating of photoresist, or PECVD of an organic polymer. The first sacrificial layer 601 is cured by a serial heat and plasma treatment, and a structure of the material is changed into a hydrophilic state from a hydrophobic state of the polymer.

Next, the electrodes 202, the hinge 106 and the like, are formed on the first sacrificial layer 601. For example, the electrode 202 and the hinge 106 are formed by using a known film formation technology, photolithography, or an etching technology.

Figure 7B:
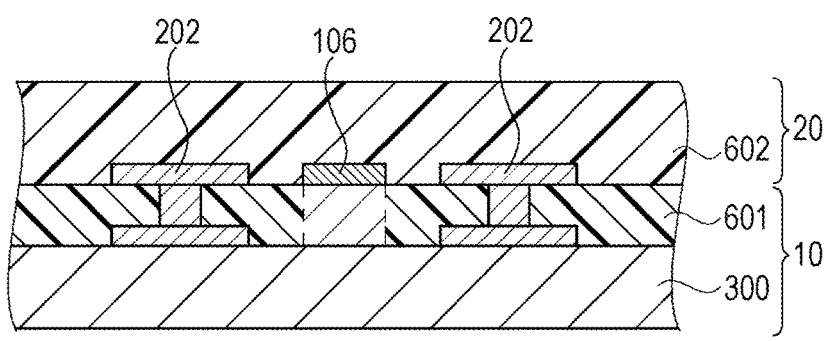

In a step S12, the intermediate portion 20 is formed. Specifically, as illustrated in FIG. 7B, a second sacrificial layer 602 having the thickness of approximately 1 μm, is accumulated on the first sacrificial layer 601. The second sacrificial layer 602 is formed in the same manner as the first sacrificial layer 601. The thickness of the second sacrificial layer 602 determines a height of the mirror 102 on the hinge 106.

Figure 7C:
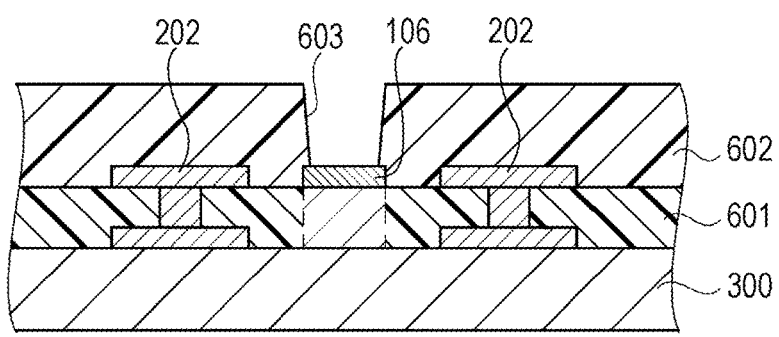

In a step S13, the first mirror film 102a configuring the upper portion 30, is formed. Specifically, first, as illustrated in FIG. 7C, an opening portion 603 is formed in the second sacrificial layer 602. For example, as a method for forming the opening portion 603, an etching method using a mask, may be used. Hereby, the surface of the hinge 106 is exposed.

Figure 7D:
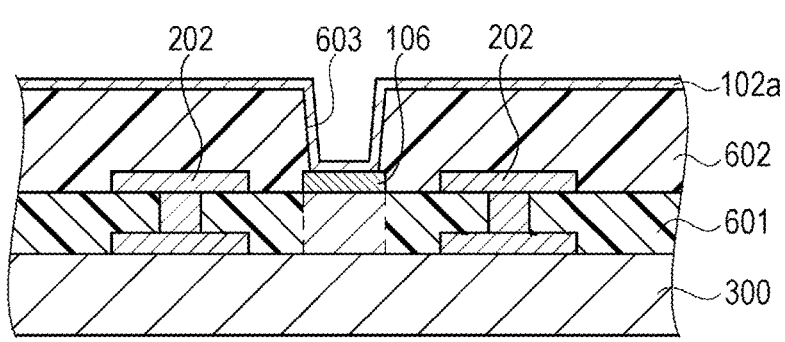

Next, in a process illustrated in FIG. 7D, the first mirror film 102a is formed, across an inner wall of the opening portion 603 from the surface of the second sacrificial layer 602. As described above, the first mirror film 102a is the aluminum. For example, the thickness of the first mirror film 102a is 1300 Å.

Figure 8A:
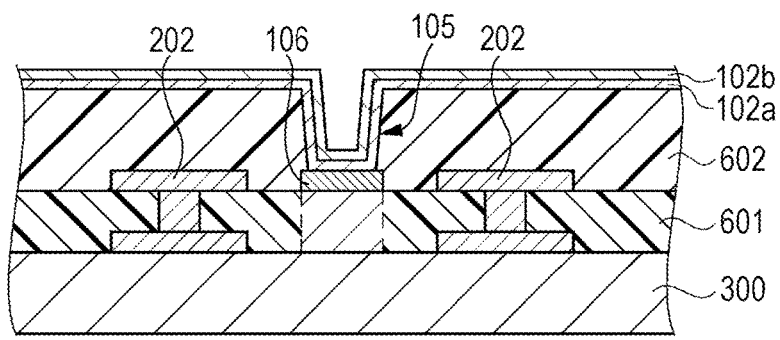
FIGS. 8A to 8C are schematic cross-sectional views partially illustrating the method for manufacturing an optical deflection device in procedure.

In a step S14, the second mirror film 102b is formed. Specifically, as illustrated in FIG. 8A, the second mirror film 102b is formed of the titanium (Ti), or the titanium nitride (TiN). For example, as a method for forming the second mirror film 102b, directional sputtering may be used. For example, the thickness is 200 Å.

Figure 8B:
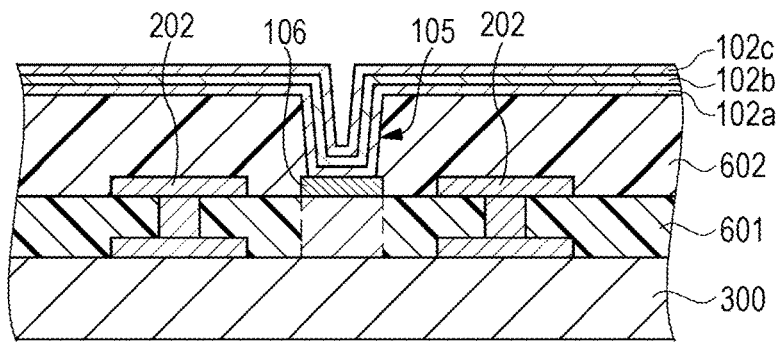

In a step S15, the third mirror film 102c is formed. Specifically, as illustrated in FIG. 8B, on the second mirror film 102b, the third mirror film 102c which is made up of the aluminum (Al), is formed. For example, the thickness of the third mirror film 102c is 1000 Å. For example, as a method for forming the third mirror film 102c, a sputtering method may be used.

Figure 8C:
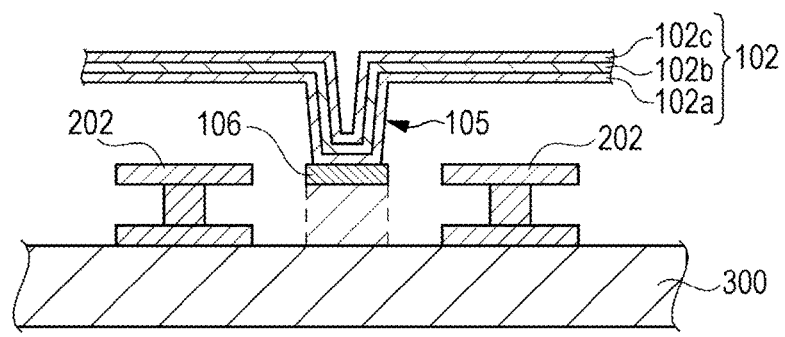

In a step S16, the mirror 102 is completed by removing the sacrificial layers (601, 602). First, by patterning the mirror films 102a to 102c, the mirror films 102a to 102c are divided into the individual mirrors 102. Thereafter, as illustrated in FIG. 8C, the first sacrificial layer 601 and the second sacrificial layer 602 are removed, for example, by using fluorine gas.

In this manner, by interposing the titanium which is the second mirror film 102b between the aluminums which are the first mirror film 102a and the third mirror film 102c, at the time of removing the sacrificial layers 601 and 602, fluorine-based gas or a fluorine-based drug solution may be used, without adding the damage to the titanium (for example, without becoming an titanium oxide). Hereby, degrees of freedom of the process, are enhanced.

Moreover, simply by thickening the film thickness of the aluminum, a reflectance is enhanced. However, if being the aluminum of which the base is the titanium, even when the film thickness of the aluminum is thin, the sufficient reflectance is obtained. That is, it is possible to obtain an effect which is comparable to the thick aluminum.

Moreover, from a point that the film thickness is thin, it is easy to form the film. Accordingly, there is a merit on the production. Still more, variation in the film thickness, is reduced. In addition, by thinning the film thickness, a weight becomes light, and a high speed operation of the mirror 102 is possible. For example, it is possible to realize high resolution which is capable of increasing pixels.

In the related art, $SiO_2$, a polymer or the like, is arranged in the base of the aluminum. According thereto, if the plane orientation is not present as $SiO_2$ or the polymer, the base of the aluminum is headed toward a random direction. However, in the embodiment, by forming the titanium having the plane orientation of (002) in the base of the aluminum, the plane of the aluminum of which the plane orientation is (111), is formed thereon. Regardless of the base, the titanium is a material which becomes the (002) plane orientation.

Specifically, the titanium is likely to be oriented toward the (002) plane. The aluminum is likely to be oriented toward the (111) plane. Sine the (002) plane of the titanium and the (111) plane of the aluminum are close, the lattice plane space is headed toward the (111) plane of the aluminum. Moreover, since the lattice plane spaces are closer thereto, it is possible to suppress the migration of an atom of the titanium. Still more, since lattice multipliers are similar to each other, it is possible to be chemically stable.

Moreover, when the mirror 102 is configured of the second mirror film 102b and the third mirror film 102c, the lattice plane space is spread at the time of oxidizing the second mirror film 102b, and a warpage may occur in the mirror 102.

However, by interposing the titanium between the aluminums, unevenness of the surface of the aluminum is suppressed. Furthermore, since the aluminum is arranged in the lower layer of the titanium, and the titanium is not exposed, the lower side of the titanium is not oxidized, and the mirror can be electrically operated.

As described in the embodiment, when the mirror 102 is configured of three layers of the first mirror film 102a to the third mirror film 102c, since the films are present above and below the second mirror film 102b, the oxidation of the second mirror film 102b is made by oxidizing only an end portion of the mirror 102, and the thickness of an outer peripheral portion of the mirror 102 is changed. Accordingly, it is possible to reduce that a function as a mirror 102 is degraded.

Moreover, since the first mirror film 102a and the third mirror film 102c are formed of the aluminum, the surface of the aluminum may be oxidized. However, since both of the films are the same materials, the upper portion and the lower portion are equally oxidized, and it is possible to suppress the occurrence of the warpage in the mirror 102. Hereupon, the optical deflection device 100 is completed.

As detailedly described above, according to the optical deflection device 100 of the embodiment, and the method for manufacturing the optical deflection device 100, the effects which are illustrated below, are obtained.

(1) According to the optical deflection device 100 of the embodiment, and the method for manufacturing the optical deflection device 100, since the third mirror film 102c which is the aluminum (plane orientation of the crystal, (111)), is formed on the second mirror film 102b which is the titanium (plane orientation of the crystal, (002)) or the titanium nitride, for example, the space difference between the spaces of the lattice plane of the portion where the two films overlap each other above and below, can be small, and it is possible to flatten the surface of the third mirror film 102c which is the uppermost film. As a result, it is possible to enhance the reflectance, and it is possible to enhance luminance. Moreover, since the titanium or the titanium nitride which is the second mirror film 102b, is interposed between the aluminums which are the first mirror film 102a and the third mirror film 102c, even when the mirror 102 is exposed into the atmosphere (even when the mirror 102 comes into contact with the fluorine gas), it is possible to reduce an amount in which an oxidation film is formed in the titanium. As a result, it is possible to suppress the occurrence of the warpage in the mirror 102. As a result, it is possible to enhance the luminance.

(2) According to the optical deflection device 100 of the embodiment, and the method for manufacturing the optical deflection device 100, since the second mirror film 102b which is formed of the titanium or the titanium nitride, is interposed between the first mirror film 102a and the third mirror film 102c which are formed of the aluminums, even when the oxidation film is formed on the first mirror film 102a and the third mirror film 102c, the approximately uniform oxidation film is formed on the first mirror film 102a of the lower layer, and the third mirror film 102c of the upper layer. Accordingly, the well-balanced oxidation is performed, and it is possible to suppress the occurrence of the warpage in the mirror 102.

(3) According to the optical deflection device 100 of the embodiment, and the method for manufacturing the optical deflection device 100, since the aluminum or the titanium nitride as a first mirror film 102a, is formed in the lowermost layer of the mirror 102, it is possible to suppress the exposure of the titanium. Accordingly, the mirror 102 can be suppressed from being oxidized, and it is possible to suppress the occurrence of the warpage in the mirror 102.

(4) According to the projector 1000 of the embodiment, since the above-described optical deflection device 100 is included, it is possible to provide the electronic apparatus that is capable of enhancing display quality.

Furthermore, the embodiments of the invention are not limited to the embodiments described above, and may be appropriately modified within the scope without departing from the gist or the idea of the invention which is read from the claims and the entire specification, and are included in the technical scope of the embodiments of the invention. Moreover, the invention can be carried out by the following forms.

MODIFICATION EXAMPLE 1

Figure 9:
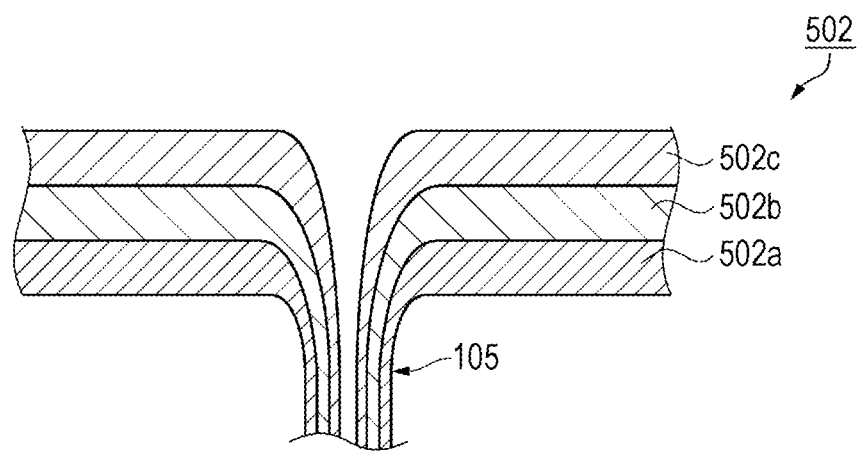
FIG. 9 is an enlarged cross-sectional view enlarging and illustrating a mirror of an optical deflection device of Modification Example.

As described above, the mirror 102 is not limited to the stacked film of the aluminum (Al) from the lower layer side, the titanium (Ti) (or the titanium nitride (TiN)) and the aluminum (Al), and may be made, for example, in the configuration illustrated below. FIG. 9 is an enlarged cross-sectional view enlarging and illustrating a mirror 502 of an optical deflection device of Modification Example.

The mirror 502 illustrated in FIG. 9, is configured of the stacked film of a first mirror film 502a which is formed of the titanium nitride (TiN) from the lower layer side, a second mirror film 502b which is formed of the titanium (Ti), and a third mirror film 502c which is formed of the aluminum (Al).

For example, the thickness of the first mirror film 502a is 200 Å to 1300 Å. For example, the thickness of the second mirror film 502b is 200 Å. For example, the thickness of the third mirror film 502c is 1300 Å.

According thereto, since the second mirror film 502b which is formed of the titanium, is arranged on the first mirror film 502a which is formed of the titanium nitride, and since the titanium can be suppressed from be oxidized, and the oxidation of the first mirror film 502a is suppressed, the thickness of the first mirror film 502a can be thin, in comparison with the first mirror film 102a which is formed of the aluminum. Consequently, although the balance at the time of being oxidized, is changed depending on changing the material, the whole mirror 102 can be light, and the operation of the mirror 102 can be easily performed.

MODIFICATION EXAMPLE 2

As described above, it is not limited to using the titanium or the titanium nitride as second mirror film 102b, and for example, tungsten, Ti tungsten, tungsten silicide, molybdenum or the like, may be used.

MODIFICATION EXAMPLE 3

As described above, as an electronic apparatus to which the optical deflection device 100 is mounted, various types of the electronic apparatuses such as a head-up display (HUD), a head-mounted display (HMD), a mobile mini projector, an in-vehicle apparatus, an audio apparatus, a light exposing device and an illumination apparatus, may be used, in addition to the projector 1000.

The entire disclosure of Japanese Patent Application No. 2014-151558, filed Jul. 25, 2014 is expressly incorporated by reference herein.

What is claimed is:

1. An electrooptical device comprising:
  a substrate;
  a mirror that is arranged so as to be separated from the substrate on one plane of the substrate; and
  a supporting portion that is arranged between the substrate and the mirror, and has a portion which is connected to a portion of the mirror so as to support the mirror,
  wherein the mirror includes
    a reflective metal film that is arranged on a side of the mirror which is opposite to the substrate,
    a high melting point metal film that is arranged between the reflective metal film and the substrate, and an antioxidative film that is arranged between the high melting point metal film and the substrate, and
wherein
the reflective metal film and the antioxidative film include a same material, and
the high melting point metal film is thinner than the reflective metal film and the antioxidative film.

2. The electrooptical device according to claim 1, wherein the high melting point metal film is titanium, or a titanium nitride.

3. The electrooptical device according to claim 1, wherein the reflective metal film is aluminum.

4. The electrooptical device according to claim 1, wherein the antioxidative film comprises aluminum.

5. An electronic apparatus comprising:
the electrooptical device according to claim 1.

6. An electronic apparatus comprising:
the electrooptical device according to claim 2.

7. An electronic apparatus comprising:
the electrooptical device according to claim 3.

8. An electronic apparatus comprising:
the electrooptical device according to claim 4.

9. The electrooptical device according to claim 1, wherein a thickness of the high melting point metal film is about 200 Å.

* * * * *